J. Q. ADAMS.
DEVICE FOR VIEWING AND MAGNIFYING LINES, &c.
APPLICATION FILED JAN. 19, 1915.
1,137,444.  Patented Apr. 27, 1915.
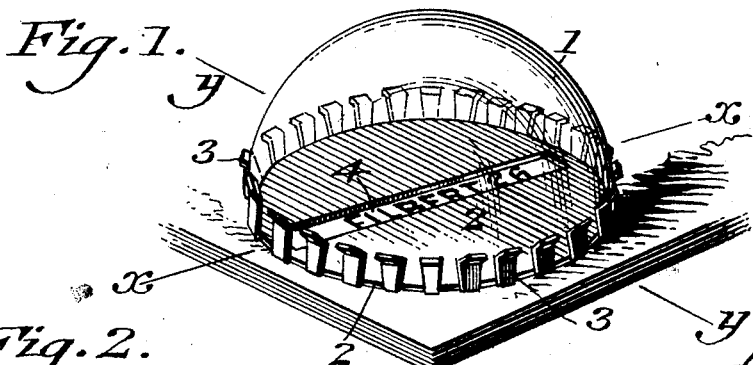
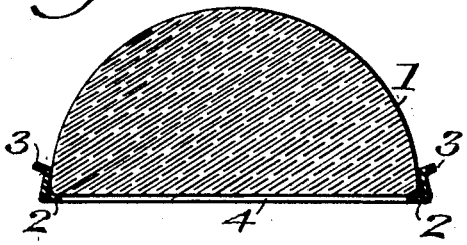
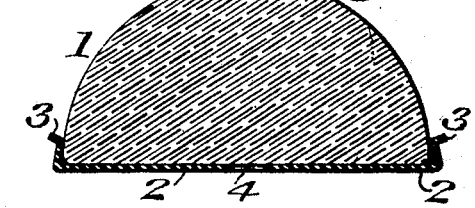
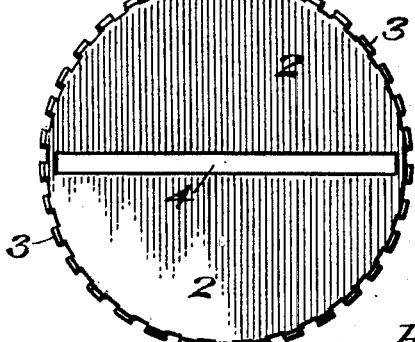
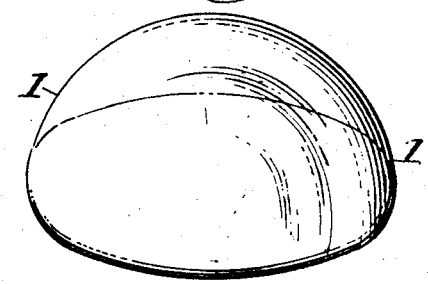
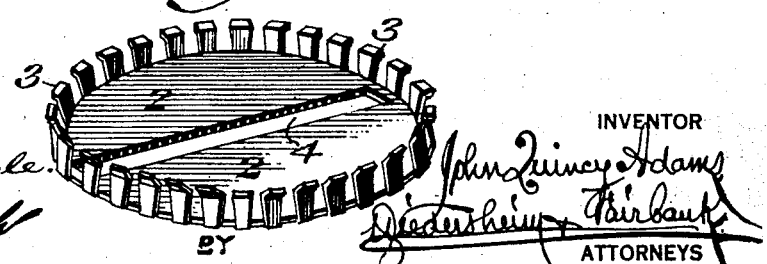
WITNESSES
P. F. Nagle.
H. G. Dieterich
INVENTOR
John Quincy Adams
BY
Diedersheim Fairbank
ATTORNEYS

UNITED STATES PATENT OFFICE.

JOHN QUINCY ADAMS, OF WESTMONT, NEW JERSEY.

DEVICE FOR VIEWING AND MAGNIFYING LINES, &c.

1,137,444.     Specification of Letters Patent.    Patented Apr. 27, 1915.

Application filed January 19, 1915. Serial No. 3,018.

*To all whom it may concern:*

Be it known that I, JOHN QUINCY ADAMS, a citizen of the United States, residing at Westmont, in the county of Camden, State of New Jersey, have invented a new and useful Device for Viewing and Magnifying Lines, &c., of which the following is a specification.

My invention relates to a device for viewing and magnifying addresses in telephone, telegraphic-code, account and other books, directories, dictionaries and other printed and written matter.

To this end, the device consists of a lens, and a base member thereon, adapted to allow the matter to be viewed and magnified to be seen through the lens, and other matter surrounding the same to be covered or obscured.

The invention is satisfactorily illustrated in the accompanying drawing, but the important instrumentalities thereof may be varied, as long as they are included in the scope of the claim.

Figure 1 represents a perspective view of a viewer and magnifier embodying my invention. Figs. 2 and 3 represent sections in diametrical opposite directions on lines $x$—$x$ and $y$—$y$ Fig. 1. Fig. 4 represents a bottom plan view thereof. Fig. 5 represents a perspective view of the lens proper of the device. Fig. 6 represents a perspective view of the base member of the device.

Similar numerals of reference indicate corresponding parts in the figures.

Referring to the drawings, 1 designates a lens or what may be termed a magnifying glass preferably of plano-convex form, and 2 designates a plate of metal or other suitable material which is placed upon the underside of the lens and formed with a circumferential rim or gallery 3 which is turned up from said plate and adapted to clasp the adjacent portion of the side of the lens, thus retaining the plate on the lens at the bottom thereof. In the plate at the center thereof is the diametrically extending opening 4 therethrough for the passage of light, while the remaining portion of said plate is opaque or dark, and so cannot be seen through.

The operation is as follows: The device is placed as an optical instrument, say on a page of a book or a sheet of printed, written or other matter so that the opening 4 is over a line of said page, sheet, etc., to be viewed, said line thus being magnified and presented most clearly to the eye while the device may remain on the matter with the line preserved for future vision or reference, especially in telephone directories where it may be necessary to duplicate a call, and the place thereof on the book is preserved, the device remaining as a paper weight with the advantages stated. The solid portion of the plate 2 obscures the matter on the book, etc., outside of the line that is presented through the opening 4 so as to cause no confusion in reading said line. The plate may be readily removed from the lens for purpose of cleansing the latter, especially at the bottom thereof, and the lens is not changed in its nature by any applied coatings to obscure the underside thereof, nor any transparent rib between said coating as heretofore practised, while the plate forms a solid base for the lens which removes the glass of the latter at its bottom from contact with the article on which the device is placed, and so guards and protects said bottom from fracture, while also covering the lower corner of the lens, preventing chipping of the same, while the lens owing to its nature, clear through, remains a microscope or reading glass, as best shown in Fig. 5.

Having thus described my invention what I claim as new and desire to secure by Letters Patent, is:—

In a viewer and magnifier of the character stated, a lens, and a base plate therefor separate therefrom, said plate having in a portion thereof, an opening therethrough, and the remaining portion thereof of opaque nature, and a peripheral rim adapted to embrace the side of the lens about the bottom thereof for attachment of said plate to said lens.

JOHN QUINCY ADAMS.

Witnesses:
JOHN A. WIEDERSHEIM,
N. BUSSINGER.

Copies of this patent may be obtained for five cents each, by addressing the "Commissioner of Patents Washington, D. C."